United States Patent
Quinn et al.

(10) Patent No.: US 7,145,892 B2
(45) Date of Patent: Dec. 5, 2006

(54) METHOD AND APPARATUS FOR ADAPTIVE WIRELESS INFORMATION HANDLING SYSTEM BRIDGING

(75) Inventors: William Bernard Quinn, Austin, TX (US); Pratik Mukundray Mehta, Austin, TX (US); Alan Eric Sicher, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 904 days.

(21) Appl. No.: 10/090,966

(22) Filed: Mar. 5, 2002

(65) Prior Publication Data

US 2003/0169696 A1 Sep. 11, 2003

(51) Int. Cl.
 *H04Q 7/24* (2006.01)
 *H04L 12/28* (2006.01)
(52) U.S. Cl. .................................... 370/338; 370/401
(58) Field of Classification Search ............... 370/310, 370/315, 351, 401, 328, 338; 455/11.1, 500
 See application file for complete search history.

(56) References Cited

U.S. PATENT DOCUMENTS

| | | | |
|---|---|---|---|
| 5,898,679 A * | 4/1999 | Brederveld et al. | 370/315 |
| 5,907,540 A * | 5/1999 | Hayashi | 370/315 |
| 5,930,240 A * | 7/1999 | Wichman | 370/315 |
| 2003/0151513 A1 * | 8/2003 | Herrmann et al. | 340/573.1 |

OTHER PUBLICATIONS

Ying-Dar Lin; Yu-Ching Hsu; Kuan-Wen Oyang; Tzu-Chieh Tsai; Dong-Su Yang, "Multihop wireless IEEE 802.11 LANs: a prototype implementation," Communications, 1999. ICC '99. 1999 IEEE International Conference on , vol. 3, pp. 1568-1572, 1999.*
Ying-Dar Lin; Yu-Ching Hsu, "Multihop cellular: a new architecture for wireless communications ," INFOCOM 2000. Nineteenth Annual Joint Conference of the IEEE Computer and Communications Societies. Proceedings. IEEE, vol. 3, pp. 1273-1282, Mar. 26-30, 2000.*

\* cited by examiner

*Primary Examiner*—Chau Nguyen
*Assistant Examiner*—Kerri M. Rose
(74) *Attorney, Agent, or Firm*—Baker Botts L.L.P.

(57) ABSTRACT

Disclosed is an apparatus and method for creating a wireless communication bridge. In one embodiment, the method includes identifying a first group of information handling systems that can establish a wireless connection with a network, selecting a first information handling system from the first group of information handling systems, establishing a first connection with the first information handling system, establishing a second connection between the first information handling system and the network, and communicating with the network via the first and second connections. In one embodiment, the first group of information handling systems is ranked according to a group of communication-related parameters, and the first information handling system is selected based on the group of communication-related parameters.

14 Claims, 5 Drawing Sheets

METHOD AND APPARATUS FOR ADAPTIVE WIRELESS INFORMATION HANDLING SYSTEM BRIDGING

BACKGROUND OF THE INVENTION

Description of the Related Art

As the value and use of information continues to increase, individuals and businesses seek additional options to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary depending on what information is handled, how the information is handled, how much information is processed, stored, or communicated, and how quickly and efficiently the information may be processed, stored, or communicated. The variations in information handling systems allow information handling systems to be general or configured for a specific user or specific use such as financial transaction processing, airline reservations, enterprise data storage, or global communications. Information-handling systems may include a variety of hardware and software components configured to process, store, and communicate information. Information handling systems may include one or more information handling systems, data storage systems and networking systems.

Information handling systems can take form as information handling systems of a wireless local area network (WLAN). WLANs typically include one or more servers that communicate with one or more information handling systems via wireless communication. Wireless communication between servers and information handling systems occur via one or more fixed network radio access points (APs). APs transmit and receive radio communication signals with information handling systems. Each AP can wirelessly communicate with information handling systems positioned within a radio coverage area of the AP. The APs are strategically placed to provide an extended radio coverage area for the WLAN. Information handling systems within the extended radio coverage area can communicate with servers of the WLAN via the strategically placed APs.

Figure 1:
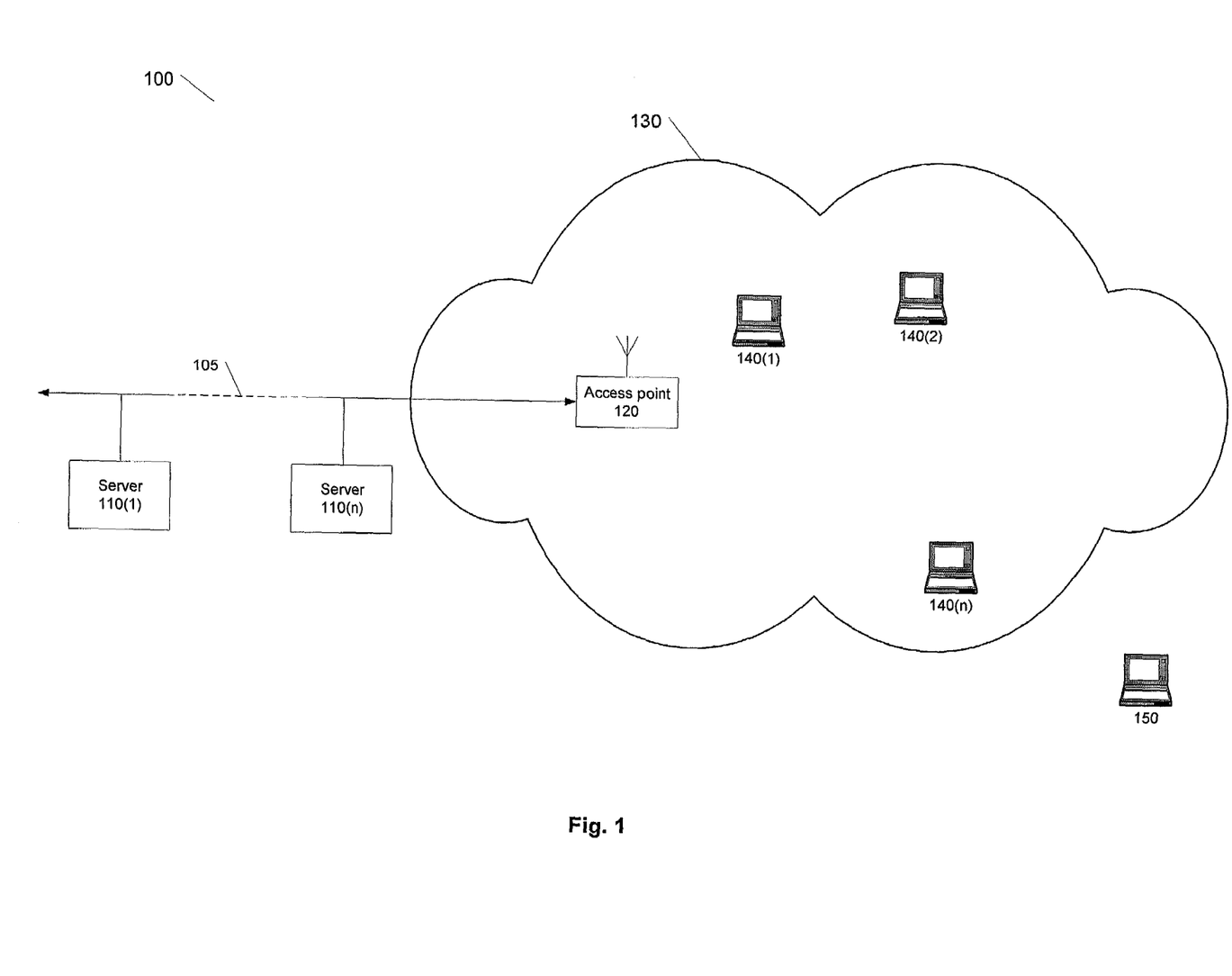
FIG. 1 illustrates an example of WLAN.

FIG. 1 illustrates an example WLAN 100. WLAN 100 includes 'n' servers 110(1)–(n) coupled together via data communication link 105. Link 105 can be any network coupling scheme (ring, ethernet, or the like). AP 120 is coupled to servers 110(1)–(n). AP 120 provides a radio coverage area 130 for information handling systems to establish communication connections with the servers in WLAN 100. There are 'n' computing systems 140(1)–(n) in radio coverage area 130. Each one of computing systems 140(1)–(n) can communicate with servers 110(1)–(n) via AP 120. information handling system 150 is located outside the radio coverage area 130. As a result, information handling system 150 cannot communicate with WLAN 100 via AP 120. For information handling system 150 to communicate with servers 110(1)–(n), information handling system 150 must be relocated within radio coverage area 130. If information handling system 150 is a mobile computing system, it can be easily relocated within coverage area 130. Relocation of information handling system 150 becomes more challenging if information handling system 150 is stationary.

SUMMARY

In one embodiment, the present invention describes an apparatus and method for creating wireless communication bridge. In one embodiment, the method includes identifying a first group of information handling systems that can establish a wireless connection with a network, selecting a first information handling system from the first group of information handling systems, establishing a first connection with the first information handling system, establishing a second connection between the first information handling system and the network, and communicating with the network via the first and second connections. In one embodiment, the first group of information handling systems is ranked according to a group of communication-related parameters, and the first information handling system is selected based on the group of communication-related parameters. In one embodiment of the present invention, the second connection with the network includes a group of individual connections between a second group of information handling systems.

BRIEF DESCRIPTION OF THE DRAWINGS

The present invention may be better understood, and its numerous objects, features, and advantages made apparent to those skilled in the art by referencing the accompanying drawing.

DETAILED DESCRIPTION OF THE INVENTION

The following is intended to provide a detailed description of an example of the invention and should not be taken to limit the invention itself. Rather, any number of variations may fall within the scope of the invention that is defined in the claims following the description.

The present invention describes a method and apparatus for establishing a communication bridge for an information handling system. The bridge enables wireless communication between the information handling system and a WLAN when the information handling system is located outside the extended radio coverage area of the WLAN. More particularly, when the information handling system is outside the extended radio coverage area of the WLAN, the information handling system identifies a peer information handling system positioned within the extended radio coverage area of the WLAN. The identified peer information handling systems is capable of wireless communication with the information handling system located outside of the extended coverage of the WLAN. Further, the identified peer information handling system is capable of wired or wireless communication with the WLAN. The information handling system positioned outside the extended radio coverage area establishes a communication bridge directly or indirectly using the identified peer information handling system. The information handling system can communicate with the WLAN through the communication bridge even though the information handling system is positioned outside the extended radio coverage area.

The information handling system establishes the communication bridge to the WLAN using the identified peer information handling system. In the alternative, the information handling system is capable of creating a communication bridge to the WLAN using multiple peer information handling systems, some of which may be outside of the extended radio coverage area. For example, the information handling system may communicate with the WLAN via a bridge consisting of a pair of peer information handling systems, each one of which is capable of wireless communication. One of the pair of peer information handling systems may be located outside the extended radio coverage area of the WLAN. Establishing a communication bridge using multiple peer information handling systems is referred to as 'peer-hopping.' When the information handling system locates multiple peers that can used to establish a communication bridge with the WLAN, the information handling system can determine the best communication bridge of several optional communication bridges based on multiple communication-related parameters.

When the bridge to the WLAN does not conform to certain communication-related parameters or the bridge using the peer is lost for any reason, the information handling system can reestablish the same communication bridge or establish a different communication bridge using a different peer information handling system positioned within the extended radio coverage area.

Figure 2A:
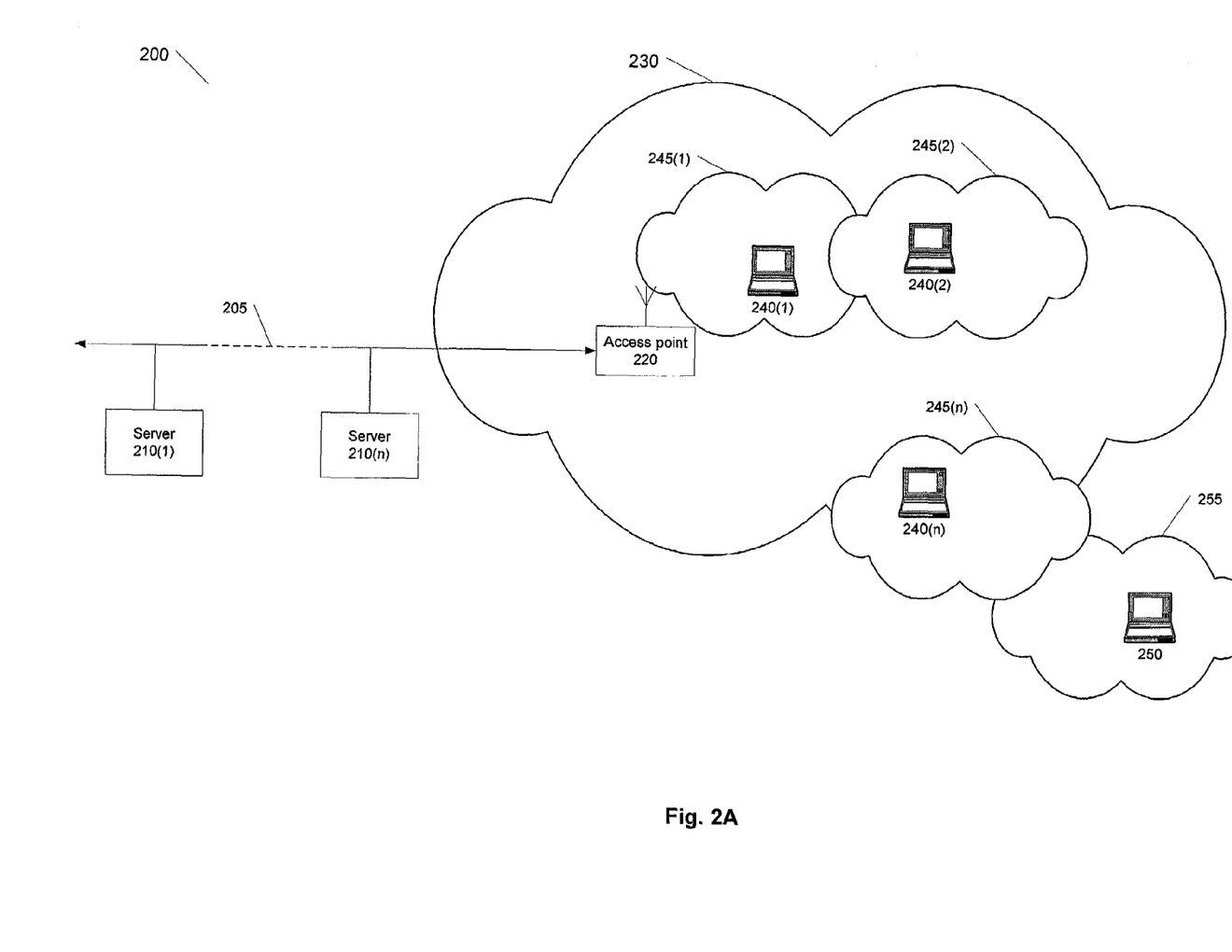
FIG. 2A illustrates an example of a WLAN employing an embodiment of the present invention.

FIG. 2A illustrates a WLAN 200 employing one embodiment of the present invention. WLAN 200 includes servers 210(1)–(n) coupled via communication link 205. Link 205 can be any network connection. WLAN 200 can take form in any network configuration (e.g., ring, star, mesh or the like). WLAN 200 includes one or more APs. For purposes of explanation, WLAN will be described as containing one AP 220.

AP 220 has a radio coverage area 230 to provide wireless communication with receive, retrieve, originate, switch, store, display, manifest, detect, record, reproduce, handle, or utilize any form of information, intelligence, or data for business, scientific, control, or other purposes. For example, an information handling system may be a personal computer, a personal digital assistant, a network storage device, or any other suitable device and may vary in size, shape, performance, functionality, and price.

The information handling systems 240(1)–(n) may include one or more processing resources such as a central processing unit (CPU) for executing the instructions for creating the communication bridge. The CPUs may be coupled to memory that stores instructions for creating a communication bridge with the WLAN 200. Additional components of the information handling systems 240(1)–(n) may include one or more disk drives, one or more network ports for communicating with external devices as well as various input and output (I/O) devices, such as a keyboard, a mouse, and a video display. The information handling systems 240(1)–(n) may also include one or more buses operable to transmit communications between the various hardware components. The present invention will be described with reference to APs wirelessly communicating with information handling systems 240(1)–(n) embodied in information handling systems, it being understood that the present invention may find application with APs wirelessly communicating with other types of information handling systems.

information handling systems 240(1)–(n) can be any computing systems (e.g., mobile, stationary or the like). Each of the information handling systems 240(1)–(n) has a transceiver that is capable of wireless communication with AP 220 or wireless communication with a transceiver of another information handling system. information handling systems 240(1)–(n) have their own individual radio coverage areas 245(1)–(n). For example, information handling system 240(1) has radio coverage area 245(1), information handling system 240(2) has radio coverage area 245(2) and so on. The coverage areas of information handling systems 240(1)–(n) overlap with the radio coverage area 230 of AP 220; thus, each of information handling systems 240(1)–(n) can establish communication with AP 220.

information handling system 250 is located outside the coverage area 230 of AP 220 information handling system 250 can be any computing systems (e.g., mobile, stationary or the like) information handling system 250 has a coverage area 255 that does not overlap the coverage area 230 of AP 220; thus, information handling system 250 cannot establish a direct communication link with AP 220. Although not shown, coverage area 255 of information handling system 250 could overlap with coverage area 230 of AP 220, yet information handling system 250 may determine that it cannot establish a communication link with AP 220 because of poor communication-related parameters (e.g., poor radio signal quality, high Bit Error Rate (BER) or low throughput rate or the like).

Figure 2B:
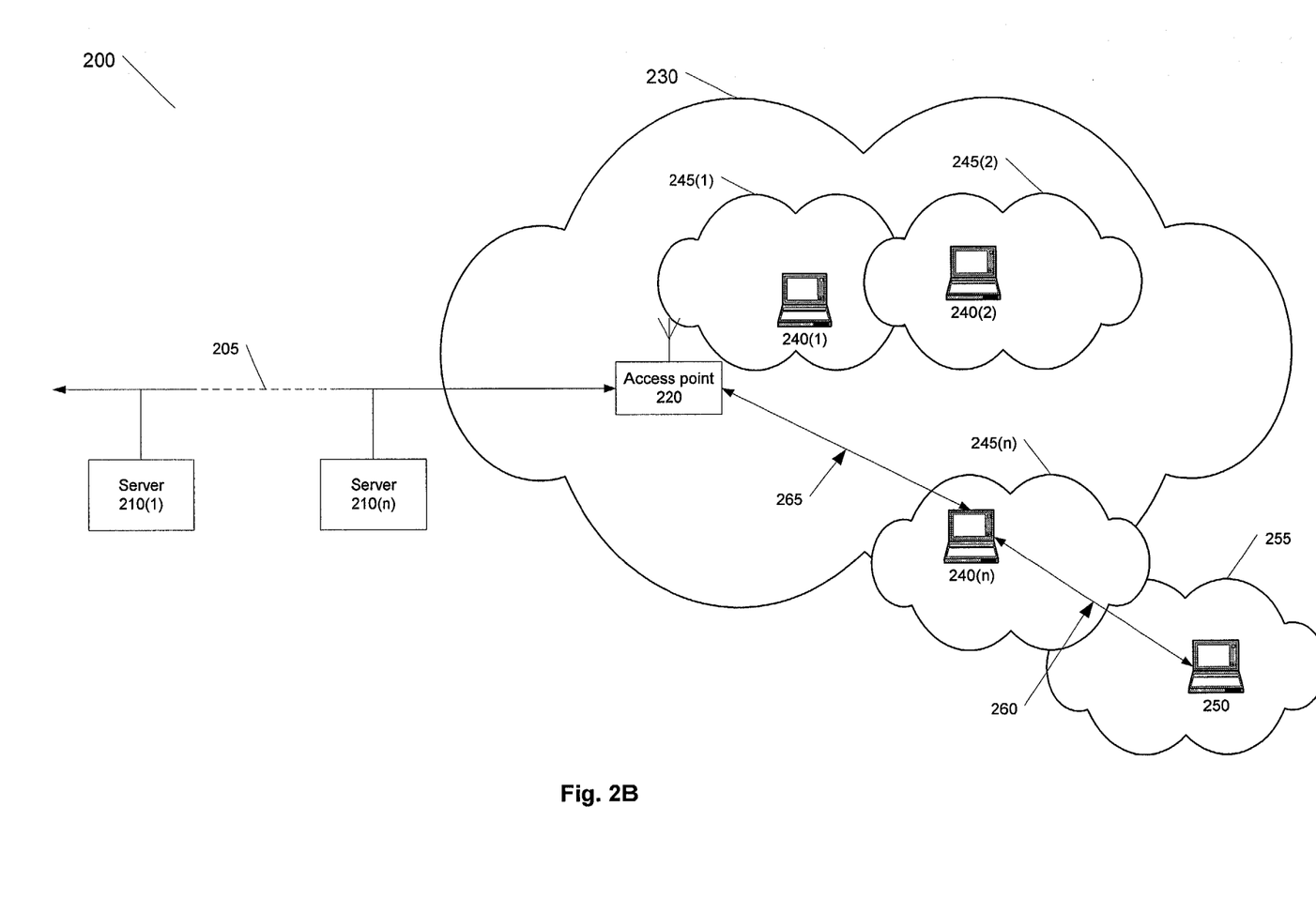
FIG. 2B illustrates an example of network connection via peer discovery according to an embodiment of the present invention.

FIG. 2B illustrates an example of communication bridge created via peer discovery according to one embodiment of the present invention. When information handling system 250 determines that wireless communication with AP 220 cannot be established by itself, information handling system 250 determines whether other information handling systems (also called peer information handling systems) exist through which a communication bridge with AP 220 can be established. Coverage area 255 of information handling system 250 overlaps the coverage area 245(n) of information handling system 240(n) information handling system 250 determines that wireless communication with peer information handling system 240(n) can be established information handling system 250 exchanges information with information handling system 240(n). For example, information handling system 250 can inquire whether information handling system 240(n) is in wireless communication WLAN 200 via AP 220, whether information handling system 240(n) is in wired communication with WLAN 200, whether information handling system 240(n) is in wireless communication with WLAN 200 via AP 220 and one or more hops or intermediate information handling systems, whether information handling system 240(n) has sufficient bandwidth to communicate with information handling system 250, etc.

Once information handling system 250 obtains relevant information from peer information handling system 240(n), information handling system 250 can determine whether to establish a communication bridge using information handling system 240(n). For purposes of explanation, information handling system 250 determines that a bridge using information handling system 240(n) can be established and initiates the creation of such bridge information handling system 250 establishes the bridge using information handling system 240(n) information handling system 240(n) then establishes a connection with AP 220. In this example, the communication bridge consists of information handling system 240(n) and data links 260 and 265 information handling system communicates with AP 220 via the communication bridge. After the bridge with information handling system 240(n) is established, information handling system 240(n) acts as the master of the bridge. The bridging of information handling system 250 is transparent to information handling system 240(n)'s connection with network 200.

Peer information handling systems (e.g., information handling system 240(n)) can be configured to allow or prohibit their use in establishing a communication bridge. Peer information handling systems can be configured to maintain a list of 'approved' bridge requesters. For example, information handling system 240(n) can maintain a list of information handling systems allowed to use information handling system 240(n) as communication bridge component. When information handling system 240(n) receives a request from information handling system 250, information handling system 240(n) can determine whether information handling system 250 is an 'approved' requester. If information handling system 250 is an 'approved' list of requester, information handling system 240(n) can allow information handling system 250 to use information handling system 240(n) in the establishment of a communication bridge. If information handling system 250 is not an 'approved' requester, information handling system 240(n) can initiate appropriate actions (e.g., reject request, inform user of unauthorized request, generate an alarm or the like). Alternatively, information handling system 240(n) can maintain a 'black' or 'disapproved' list of requesters and allow bridging for any requester not on the 'disapproved' or 'black' list.

Figure 2C:
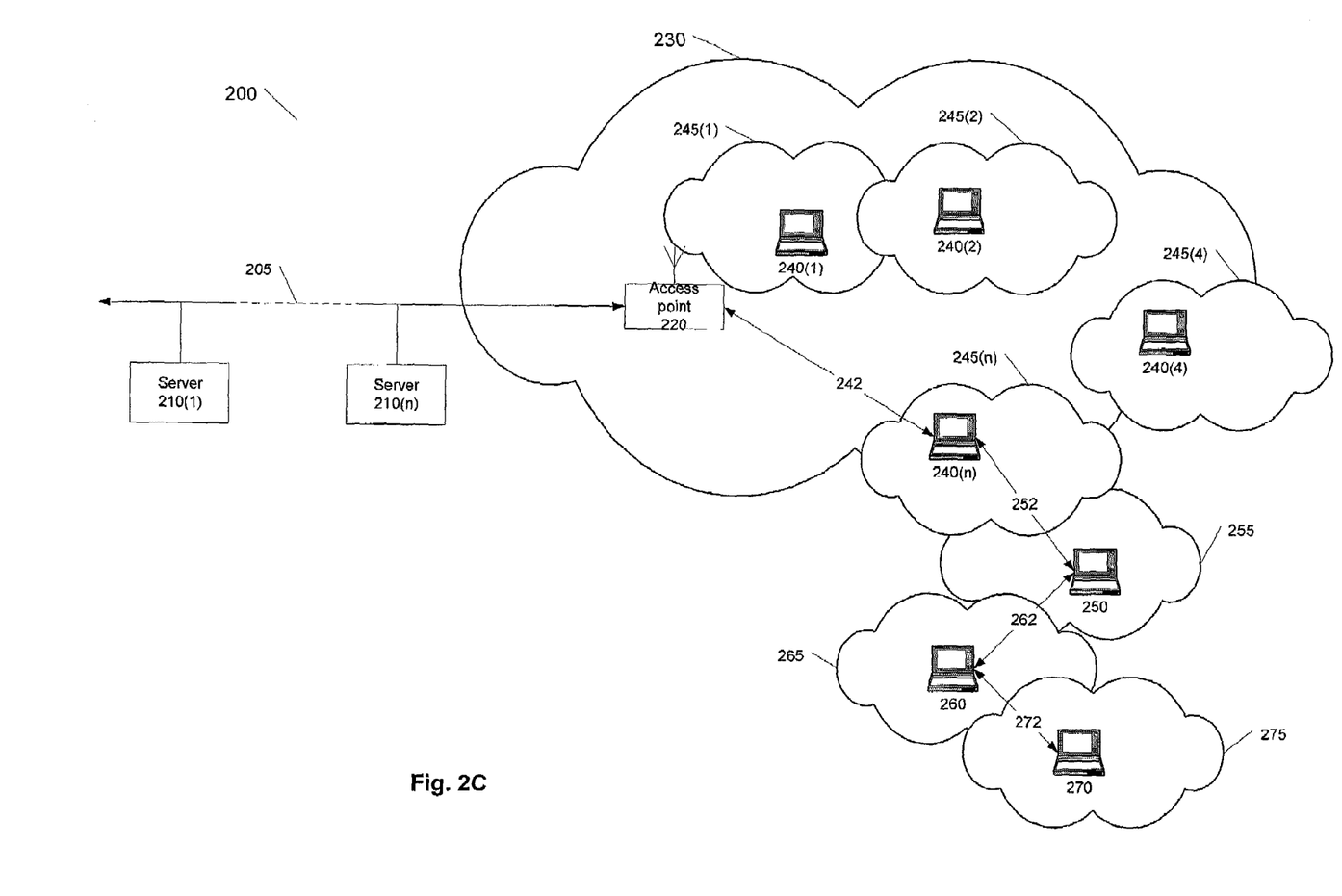
FIG. 2C illustrates an example of a multi-hop peer-to-peer bridge according to an embodiment of the present invention.

FIG. 2C illustrates an example of a multi-hop bridge according to one embodiment of the present invention. WLAN 200 includes a information handling system 260. The radio coverage area 265 of information handling system 260 overlaps radio coverage area 255 of information handling system 250. A information handling system 270 has a radio coverage area 275 that overlaps with radio coverage area 265 of information handling system 260 information handling system 270 wishes to establish communication with AP 220 (at this point information handling system 270 may not know of an explicit AP, i.e., AP 220). When information handling system 270 initiates a peer discovery process, information handling system 270 determines that there is no peer that can be used to create a communication bridge directly between AP 220 and information handling system 270. However, multiple peer information handling systems or hops are available for forming a communication bridge between information handling system 270 and AP 270. Radio coverage area 275 overlaps radio coverage area 265, radio coverage area 265 overlaps coverage area 255, radio coverage area 255 overlaps coverage area 245(n), and radio coverage area 245(n) overlaps the radio coverage area of AP 220. As such, a communication bridge may be established between information handling system 270 and AP 220 using information handling system 260, information handling system 250, and information handling system 245(n). information handling system 270 establishes a communication bridge component using information handling system 260 and link 272. information handling system 260 establishes a communication bridge component using information handling system 250 and link 262. information handling system 250 establishes a communication bridge component using information handling system 240(n) and link 252. Finally, information handling system 240(n) establishes communication with AP 220 via link 242 thereby creating multiple hop communication bridge between information handling system 270 and AP 220. The quality of communication between information handling system 270 and AP 220 over the multiple hop bridge depends upon various communication-related parameters (e.g., available bandwidth at each hop, processing capacity of each hop, throughput over each link and the like). The security (i.e., data privacy or the like) can be maintained over the multiple hop bridge using security techniques (e.g., end-to-end tunneling or the like) known in the art.

information handling system 270 can determine how many hops to use for creating the bridge to AP 220. The methods of determining communication-related parameters are known in the art (e.g., open shortest path first or the like). In one embodiment of the present invention, information handling system 270 searches for stationary peer information handling systems (e.g., desktop or the like) to establish a bridge. Stationary peer s are preferred when creating a bridge because mobile peer information handling systems can move out of the coverage area of AP 220 causing an established bridge to drop. In another embodiment of the present invention, information handling system 270 searches for a stationary and wired peer information handling system (e.g., a desktop directly connected with the server or the like) for creating a bridge. When a bridging information handling system is turned off (e.g., power shut off or the like), the bridge terminates. information handling system 270 can adapt to this change by establishing another communication bridge in which the peer which is turned off is replaced by another peer.

information handling system 270 monitors hop-to-hop performance of the communication bridge with WLAN 200 and determines whether specific bottlenecks (e.g., throughput, signal quality, available bandwidth or the like) exist therein. If any specific bottleneck exists at any hop, information handling system 270 can establish a different bridge that avoids the bottleneck. For example, if information handling system 270 determines that a bottleneck exists at link 242, information handling system 270 can search for another bridge between information handling system 240(n) and AP 220 that does not employ link 242.

When communication-related parameters do not conform to certain predetermined or dynamically calculated communication-related parameters (e.g., throughput, signal quality, available bandwidth or the like), information handling system 270 can dynamically establish a new bridge using other peers in the environment and continue communicating with the AP 220 via the new bridge.

According to one embodiment of the present invention, when a first bridging-peer (e.g., information handling system 240) goes off line (e.g., power shut off or the like), the first bridging-peer informs other peers that are using the first bridging peer as a component of a bridge to AP 220. The other peers then locate a replacement peer information handling system. The replacing of one peer for another can be done while information handling system 270 continues to communicate with AP 220. This can be accomplished by inter-wireless communications over the backbone network.

Figure 3:
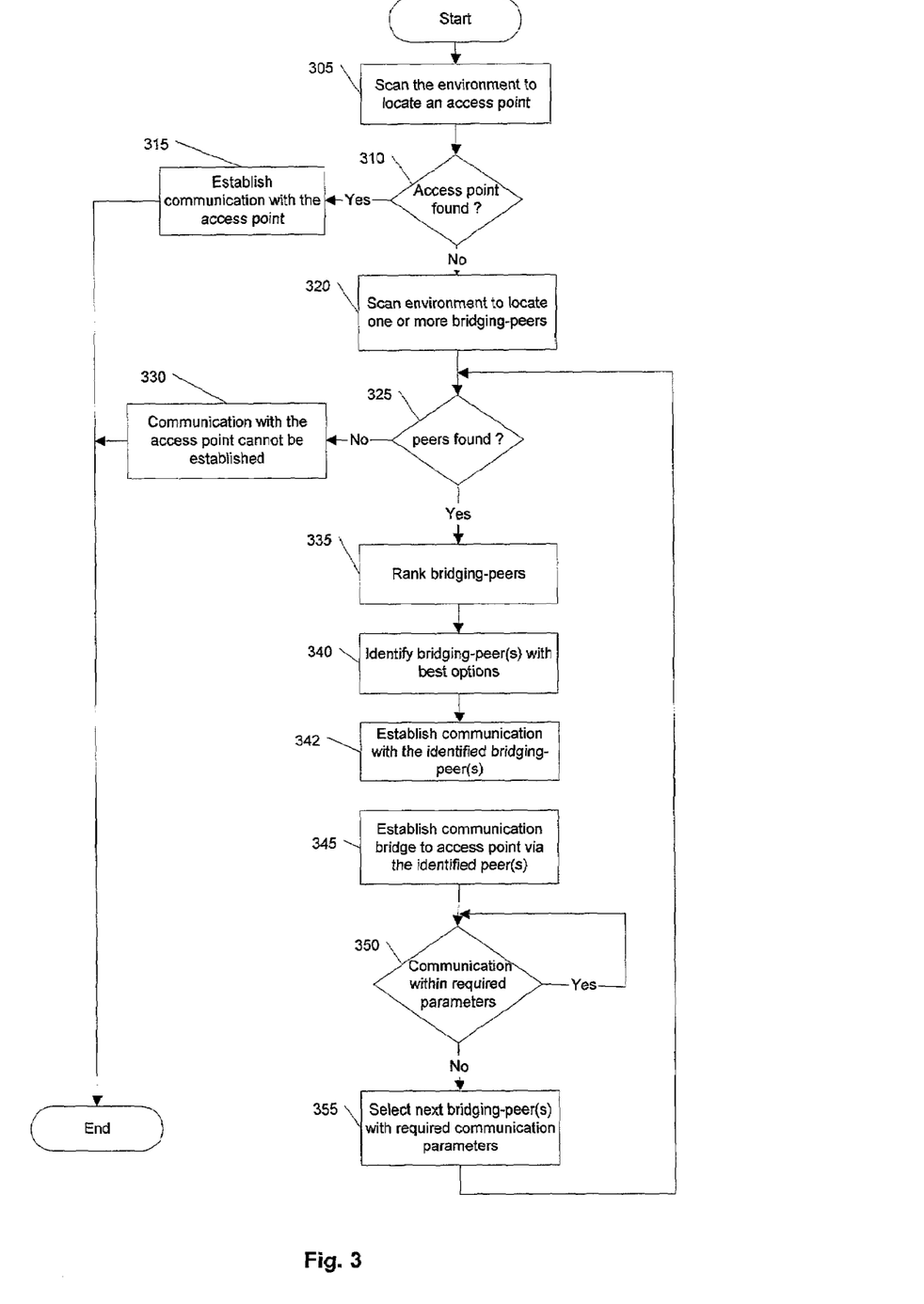
FIG. 3 is a flow diagram illustrating the steps performed during the process of establishing an adaptive wireless bridge according to an embodiment of the present invention.

FIG. 3 is a flow diagram illustrating the steps performed during the process of establishing an wireless bridge according to an embodiment of the present invention. Initially, a information handling system scans the environment to locate an AP of the network to establish a wireless communication link (305). The information handling system determines whether an AP can be found in the environment (310). If an AP can be found, the information handling system establishes a wireless communication link with the AP (315). If an AP cannot be found, the information handling system scans the environment to locate a bridging-peer (320). The information handling system determines whether one or more bridging-peers can be found (325). If bridging-peers cannot be found, the information handling system determines that communication with the network cannot be established (330).

If peers for creating a bridge can be found, the information handling system solicits the peers for required communication parameters. Thereafter, the information handling system ranks and selects one or more of the best bridging-peers that can be used to create a bridge. The ranking of the bridging-peers (335) can be based on the required communication parameters (e.g., appropriate network servers, available bandwidth, processing capability, throughput, number of hops or the like). The information handling system identifies the bridging-peers with the best communication-related parameters (340). The information handling system then establishes a bridge using one or more of the identified bridging-peers (342). Next, the information handling system establishes communication with the network via the one or more of the identified bridging-peers (345). The information handling system monitors the communication to determine whether the communication conforms to the communication-related parameters (350). The communication-related parameters can be predetermined by a software application running on the information handling system or the information handling system can dynamically adjust the communication-related parameters according to the conditions of the network. If communication does not conform to the required parameters, the information handling system selects one or more of the 'next best' bridging-peers (355). One or more of the next best bridging-peers are selected according to the bridging-peer ranking performed in step 335. The information handling system then proceeds to determine whether the next best bridging-peer is located in the environment (325).

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims.

What is claimed is:

1. A method of adaptive wireless bridging for bridging a mobile information handling system to a stationary (WLAN) network, comprising:

using programming of the information handling system to: identify one or more bridging-peer systems that can establish a wireless communication connection with the network;

select a bridging-peer system from the one or more bridging-peer systems;

wherein the selecting step is performed by giving preference to a wired bridging-peer system, if any;

establish a first communication connection between the selected bridging-peer system and said information handling system;

using programming of the selected bridging-peer system to establish a second communication connection between said selected bridging-peer system and said network; and using programming of the information handling system to communicate with the network via the first and second wireless communication connections;

wherein if the selected bridging-peer system is to go off line of the first connection, using programming of the selected bridging-peer system to send a message to the information handling system that the selected bridging-peer system will go off line; and using programming of the information handling system to identify a second bridging-peer system from said first plurality of information handling systems, and to establish a third communication connection between the information handling system and said second bridging-peer system, and using programming of the second bridging-peer system to establish a fourth communication connection between said second bridging-peer system and said network;

using programming of the information handling system to communicate with the network via the third and fourth communication connections.

2. The method of claim 1, wherein said bridging-peer system is selected based on a plurality of communication-related parameters.

3. The method of claim 2, wherein said one or more bridging-peer systems are ranked according to said plurality of communication-related parameters.

4. The method of claim 2, wherein one of said plurality of communication-related parameters is a radio signal quality of said first communication connection.

5. The method of claim 2, wherein one of said plurality of communication-related parameters is a data throughput rate of the first communication connection.

6. The method of claim 1, wherein said second communication connection with said network comprises a plurality of individual communication connections between a plurality of bridging-peer systems.

7. An information handling system comprising:

a processor;

a memory system coupled to said processor, wherein said memory stores instructions executable by the processor to perform a method, the method comprising:

identifying one or more bridging-peer systems that can establish a communication connection with the network;

selecting a bridging-peer system from the one or more bridging-peer systems;

wherein the selecting step is performed by giving preference to a wired bridging-peer system, if any;

establishing a first communication connection between the selected bridging-peer system and said information handling system;

communicating with the network via the first communication connection and a second communication connection between the selected bridging-peer system and the network;

wherein if the selected bridging-peer system is to go off line of the first connection, receiving a message from the selected bridging-peer system informing the information handling system that the selected bridging-peer system will go off line;

identifying a second bridging-peer system from said one or more bridging-peer systems, and establishing a third communication connection between the information handling system and said second bridging-peer system, and communicating with the network via the third communication connection and a fourth communication connection between the second bridging-peer system and the network.

8. The information handling system of claim 7, wherein the method further includes selecting bridging-peer system based on a plurality of communication communication-related parameters.

9. The information handling system of claim 7, wherein one of said plurality of communication communication-related parameters is radio signal quality of a wireless communication connection.

10. The information handling system of claim 7, wherein one of said plurality of communication-related parameters is data throughput rate of a wireless communication connection.

11. The information handling system of claim 7, wherein said second connection with said network comprises a plurality of individual connections between a plurality of bridging-peer systems.

12. A computer readable medium storing a set of instructions executable on a computer system to implement a method, the method comprising:

identifying one or more bridging-peer systems that can establish a communication connection with the network;

selecting a bridging-peer system from the one or more bridging-peer systems;

wherein the selecting step is performed by giving preference to a wired bridging-peer system, if any;

establishing a first communication connection between the selected bridging-peer system and said computer system;

communicating with the network via the first communication connection and a second communication connection between the selected bridging-peer system and the network;

wherein if the selected bridging-peer system is to go off line of the first connection, receiving a message from the selected bridging-peer system informing the information handling system that the selected bridging-peer system will go off line;

identifying a second bridging-peer system from said one or more bridging-peer systems, and establishing a third communication connection between the information handling system and said second bridging-peer system, and communicating with the network via the third communication connection and a fourth communication connection between the second bridging-peer system and the network.

13. The media of claim 12, wherein the method further comprises monitoring said first communication connection with said bridging-peer system.

14. The media of claim 13, wherein said set of instructions is further configured to:

if said first communication connection with said selected bridging-peer system does not conform to a plurality of communication-related parameters, identifying another bridging-peer system from said one or more bridging-peer systems;

establishing a second connection between said information handling system and said another bridging-peer system;

communicating with the network via the first information handling system and the second connection.

* * * * *